J. M. ADAMS.
METAL BEDSTEAD.
APPLICATION FILED JUNE 21, 1911.

1,052,200.

Patented Feb. 4, 1913.

UNITED STATES PATENT OFFICE.

JOHN M. ADAMS, OF CHICAGO, ILLINOIS.

METAL BEDSTEAD.

1,052,200.

Specification of Letters Patent.

Patented Feb. 4, 1913.

Application filed June 21, 1911. Serial No. 634,507.

*To all whom it may concern:*

Be it known that I, JOHN M. ADAMS, a citizen of the United States, and a resident of Chicago, in the county of Cook and State of Illinois, have invented certain new and useful Improvements in Metal Bedsteads, of which the following is a specification.

This invention relates to metal bedsteads and relates particularly to corner fastenings for such beds.

The object of the present invention is to provide improved means for detachably securing corner fastening members to the posts of metal bedsteads, constructed and arranged to prevent accidental loosening of said corner fastening members, in use.

To this end, my invention comprises the various features and details of construction hereinafter described and claimed.

In the accompanying drawing, in which my invention is fully illustrated, Figure 1 is a fragmentary, longitudinal sectional view of the post of a metal bedstead, showing a corner fastening secured thereto in accordance with my invention. Fig. 2 is a sectional view thereof, on the line 2—2 of Fig. 1; and Fig. 3 is a perspective view of the wedge forming part of my improved securing means.

Referring now to the drawings, 1 designates a post of a metal bedstead, said post being hollow in accordance with the usual construction, and 2 is a corner fastening member secured to said post, being usually made of cast iron. The means for securing said corner fastening member 2 to the post 1 comprises an eye 3 on said corner fastening member 2 which projects from the face of said corner fastening member which abuts against the post 1 and extends through a slot 4 formed in said post to receive the same. As shown, said eye 3 is formed by a staple the ends 5 of which are anchored in the corner fastening member 2.

Inserted through the eye 3 inside of the post 1, is a wedge 6, formed in the side thereof which bears against said post, is a recess 7, the bottom 8 of which is inclined lengthwise of said wedge, diverging from the side or face of said wedge which bears against the post toward the larger or head end of said wedge. Threaded through a hole in the post 1 is a screw 9 the end of which bears against the inclined surface 8 on the wedge 6, said screw being inserted after the wedge is in position.

With the described construction, it is obvious that the screw 9 will lock the wedge against endwise movement tending to loosen or disengage the same from the eye 3, while the pressure of the wedge will, in turn, prevent turning and loosening of the locking screw 9.

While I have herein shown the inclined surface 8 as formed at the bottom of the recess 7, I do not desire to limit myself to this specific construction, as said inclined surface may be formed in any position and relation desired, within the scope of my invention. Beyond the inclined surface 8, the face of the wedge 6 which bears against the post is grooved between its edges, as shown at 10, leaving longitudinal marginal bearing surfaces. This is merely to avoid fitting and dressing, and forms no part of my present invention.

I claim:—

1. In a metal bedstead, a hollow post, a corner fastening member, means for securing said corner fastening member to said post, said means comprising an eye on said corner fastening member which projects through a slot formed in said post, a wedge inserted through said eye inside of said post, and means to prevent loosening of said wedge, said means comprising an inclined surface on said wedge other than a wedging surface thereof, and a screw threaded through said post the end of which bears against said "other" inclined surface on said wedge, substantially as described.

2. In a metal bedstead, a hollow post, a corner fastening member, means for securing said corner fastening member to said post, said means comprising an eye on said corner fastening member which projects through a slot formed in said post, a wedge inserted through said eye inside of said post and means to prevent loosening of said wedge, said means comprising an inset inclined surface on said wedge other than a wedging surface thereof, and a screw threaded through said post the end of which bears against said "other" inclined surface on said wedge, substantially as described.

3. A hollow first member provided with a slot, a second member and means for securing said second member to said hollow first member, said means comprising an eye on said second member which projects through the slot in said hollow first member, a wedge inserted through said eye inside of said hollow first member, and means to prevent loosening of said wedge, said means comprising an inclined surface on said wedge other than a wedging surface thereof, and a screw threaded through said hollow first member the end of which bears against said "other" inclined surface on said wedge, substantially as described.

In testimony, that I claim the foregoing as my invention, I affix my signature in presence of two subscribing witnesses, this 19th day of June, A. D. 1911.

JOHN M. ADAMS.

Witnesses:
M. WILDNER,
K. A. COSTELLO.